Aug. 27, 1946.   S. DOBA, JR   2,406,358
GROUND SPEED METER
Filed March 21, 1944   5 Sheets-Sheet 3

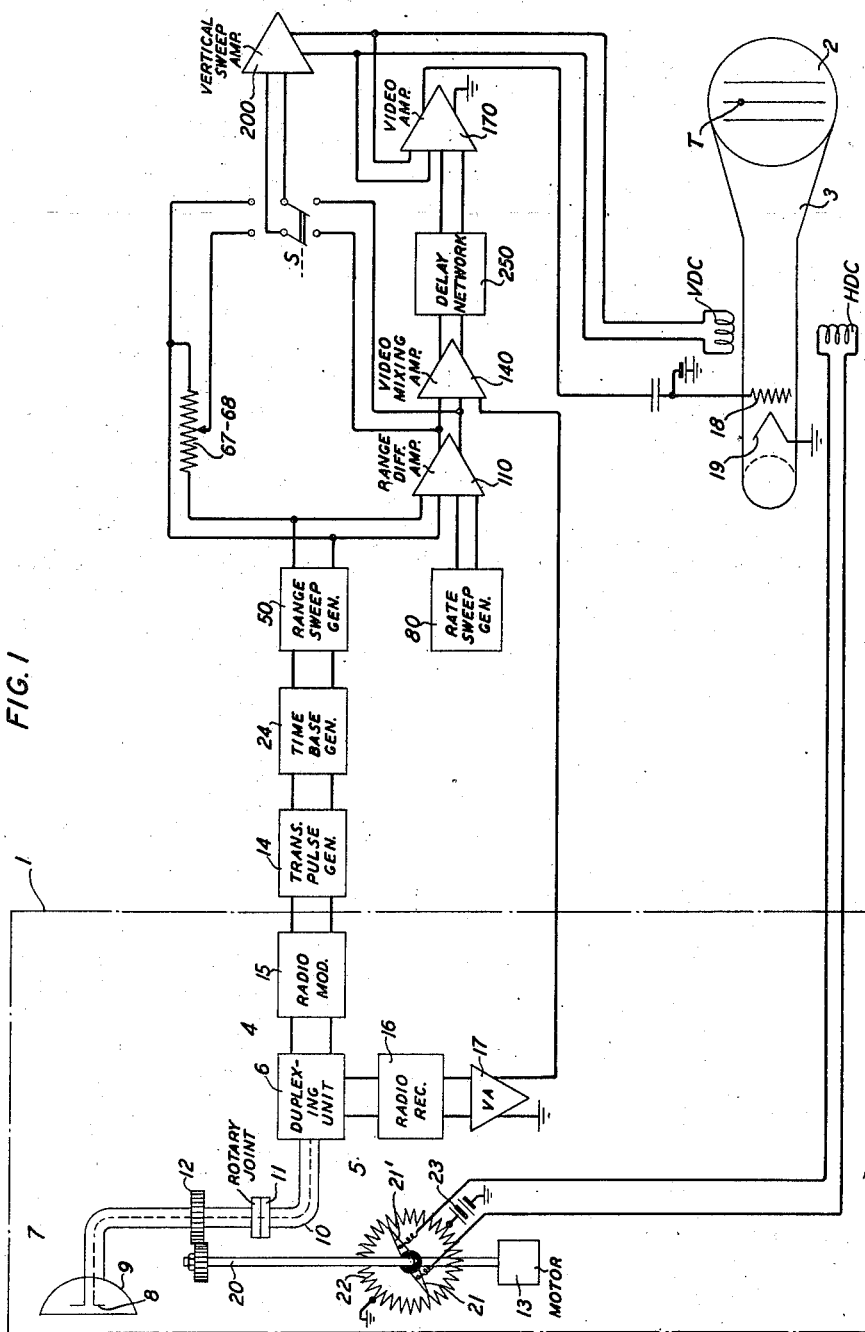

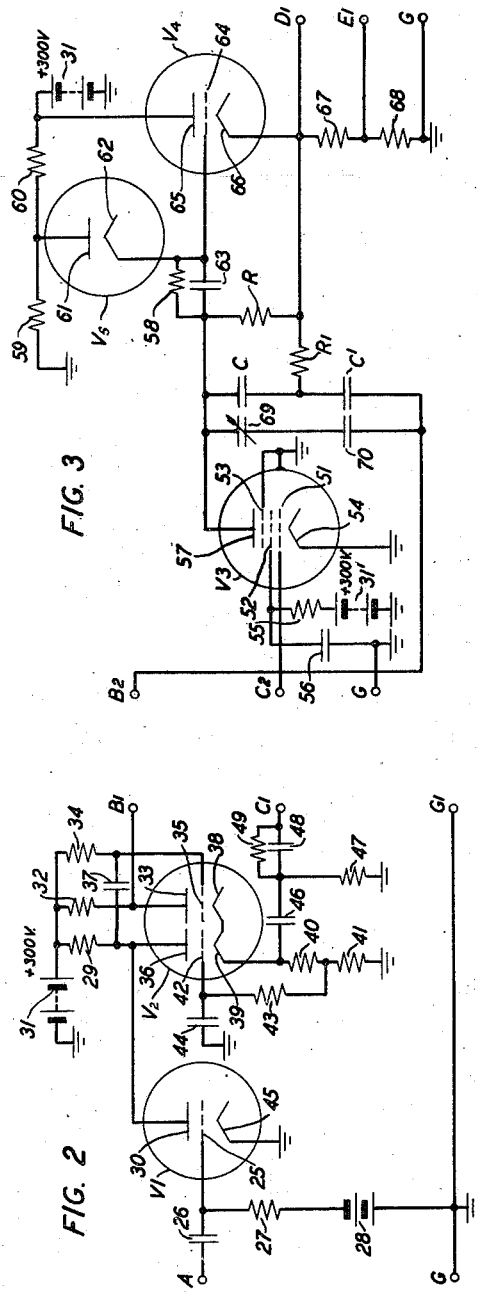

INVENTOR
S. DOBA, JR.
BY
D. MacKenzie
AGENT

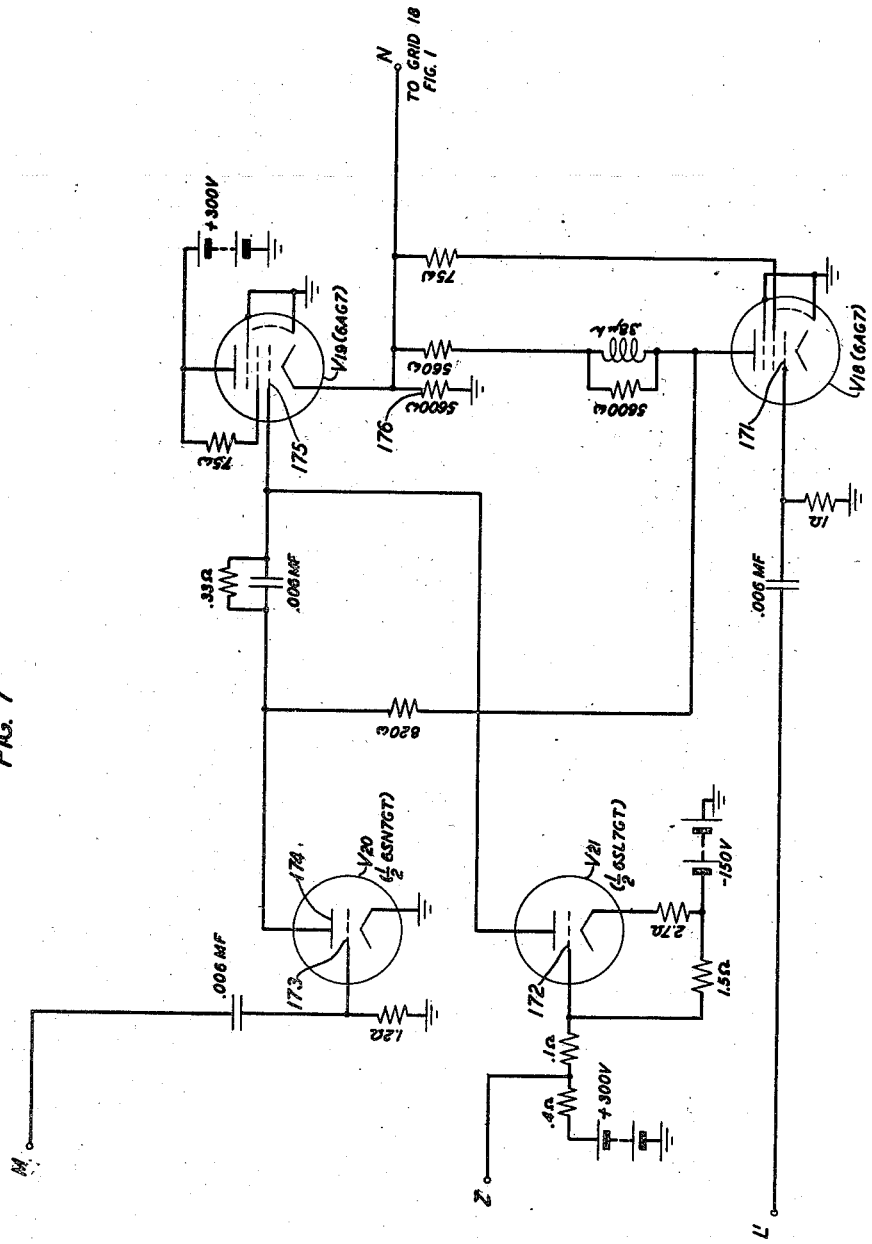

INVENTOR
S. DOBA, JR.
BY
D. MacKenzie
AGENT

Patented Aug. 27, 1946

2,406,358

UNITED STATES PATENT OFFICE 2,406,358

GROUND SPEED METER

Stephen Doba, Jr., Long Island City, N. Y., assignor to Bell Telephone Laboratories, Incorporated, New York, N. Y., a corporation of New York Application March 21, 1944, Serial No. 527,459

4 Claims. (Cl. 250—1)

This invention relates to an improved method and apparatus for measuring the relative speed of an observer and an observed object visible or invisible. The invention while particularly useful in a military airplane flying toward a target ahead, has a field of use including all cases of relative movement in the air, at sea or on land.

The general object of the invention, therefore, is to provide a method and means for measuring the relative speed at which an observer approaches an observed position.

The invention makes use of known electrical object locating and ranging means which are independent of weather and light, making such means an element in a novel system of apparatus for measuring the rate of change of range of a selected object. The invention thus achieves another object, namely, to provide speed measuring means useful in all conditions of observation.

In bombing an enemy target from an airplane, it is obviously important to know the relative speed of target and bombing plane. Hence another object of the invention is to facilitate the prosecution of war in the air, as well as to provide a navigational aid universally useful in time of peace.

The invention enables the pilot of an airplane to measure his absolute speed with respect to a point ahead. If that point is fixed on the earth's surface and its initial distance is large compared with the plane's altitude, the absolute speed measured is substantially the ground speed of the plane. For example, if the altitude is 10,000 feet and the distance on the earth's surface is 50,000 feet between the point of reference and a point vertically beneath the plane, the speed measured is 98 per cent of the ground speed. For a surface craft the measurement requires no correction. In neither case does a head or a tail wind or ocean current affect the measurement of speed. Therefore, another object of the invention is to provide navigators with means for measuring ground speed regardless of wind or current.

Figure 8:
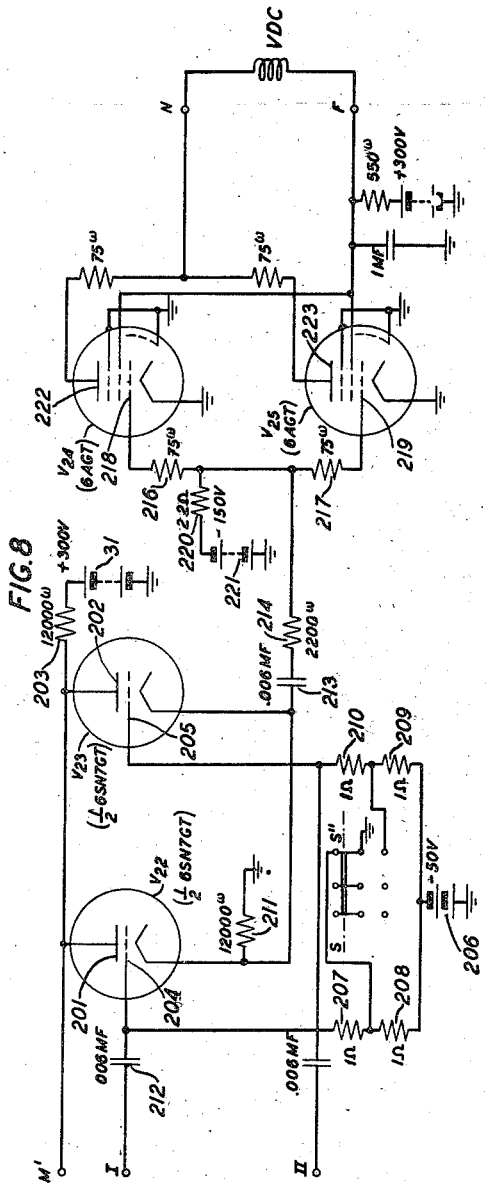
Figure 9B:
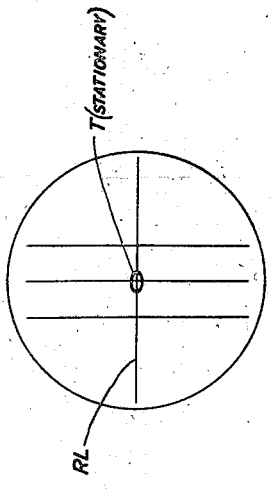
Figure 9A:
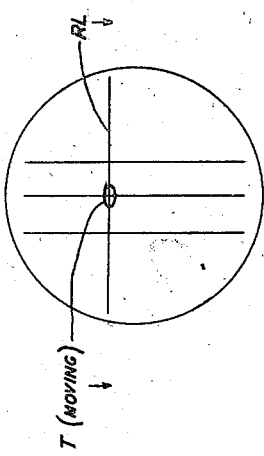

The invention is to be understood from the following description, read with reference to the accompanying drawings in which:

Fig. 1 is a block schematic diagram of the major components of the invention;

Figs. 2 to 8 are circuit diagrams representing, respectively, time base generator 24, range sweep generator 50, rate sweep generator 80, range differential amplifier 110, video mixing amplifier 140, video amplifier 170 and vertical sweep amplifier 200 of Fig. 1; and Figs. 9A and 9B illustrate the patterns on oscilloscope screen 2 produced when switch S is closed upward and downward, respectively.

In all figures like numerals and letters indicate like elements.

The invention will be described with reference to its use in an airplane which will be understood to be provided with the usual altimeter and airspeed meter. For simplicity, it will be assumed that the plane is flying directly, without leeway, toward a target ahead.

Referring now to Fig. 1, the radar system generally indicated by numeral 1, not itself a part of the present invention but here briefly described to facilitate understanding of the complete system, serves to detect the presence of a target ahead and represent that target by a luminous spot T on screen 2 of cathode ray oscilloscope 3. The location of spot T on screen 2 corresponds as later explained to the range and bearing, at a given instant, of the target represented.

System 1 includes a pulse transmitting circuit 4 and a pulse receiving circuit 5 connected through duplexing unit 6 to a common antenna 7 which is preferably of the highly directive type consisting of a small polarized dipole 8 at the focus of a parabolic reflector 9. Antenna 7 is connected by a coaxial link 10 through duplexing unit 6 to the circuits 4 and 5, with a rotary joint 11 in link 10. The portion of link 10 above joint 11 is provided with gearing 12 through which motor 13 is enabled to rotate antenna 7 at a constant speed in the horizontal plane. Rotation of antenna 7 in a vertical plane may be accomplished by a like arrangement of motor and gearing which is omitted here as unnecessary to the present description. The pulse generator 14 supplies a positive square top pulse of very short duration to control radio modulator 15 to supply at a convenient repetition rate extremely short and intense pulses of radio frequency energy to antenna 7 by which these pulses are directively radiated into space. Duplexing unit 6, which may be an automatic transmitter-receiver switch of any known type, effectively short-circuits the input to receiving circuit 5 while antenna 7 is emitting but allows free passage to circuit 5 of the low level echo received by antenna 7 from a reflecting target. The interval between successive emissions by antenna 7 is made longer than enough to include the reception of radio echoes from the most distant target to be attached.

A portion of the energy radiated by antenna 7 is intercepted and reflected, usually diffusely, by the target. A part of this reflected portion is received by antenna 7 and transformed into an electrical pulse which passes through duplexing unit 6 to radio receiver 16 in circuit 5 where it is amplified and detected. The detected pulse is further amplified by video amplifier 17 and is thus available to produce intensity modulation of the cathode ray beam of oscilloscope 3. Oscilloscope 3 may be of the well-known magnetic deflection type and is not shown in detail in Fig. 1 beyond intensity grid 18, cathode 19, fluorescent screen 2 and deflecting coils HDC and VDC for horizontal and vertical beam deflection, respectively.

Shaft 20, through which motor 13 drives gear 12, carries a pair of potentiometer wipers 21 and 21' insulated from each other and from shaft 20 on which they are mounted radially opposite each other. Wipers 21 and 21' traverse potentiometer 22 fixed in the airplane. Battery 23 is connected across diametrically opposite points of potentiometer 22. The rotation with shaft 20 of wipers 21 and 21' selects a fraction of the voltage of battery 23 ranging from zero when the pointing of antenna 7 is directly ahead to a maximum when antenna 7 points abeam. The polarity of the selected voltage depends on the left or right pointing of antenna 7 and the voltage so selected is applied to produce a current in horizontal deflecting coil HDC of oscilloscope 3. Auxiliary means, not shown, are provided for horizontal centering of the cathode ray beam on screen 2 when wipers 21 and 21' select zero voltage.

When the echo pulse from the reflecting target is available on grid 18 to produce intensity modulation of the cathode ray beam a luminous spot T representing the target will appear on screen 2 located vertically thereon at a position corresponding to the target range provided a vertical sweep current, synchronized with the emission of energy from antenna 7, is caused to flow in vertical deflecting coil VDC. The horizontal sweep current in coil HRC insures that the target spot will appear displaced left or right on screen 2 according to the bearing of the target left or right. For the present purpose, it is assumed that the target is directly ahead.

It is convenient to describe functionally the operation of some of the major components of the system of Fig. 1, postponing the detailed description of the involved circuits.

Each trigger pulse from pulse generator 14 initiates the emission of a pulse of radio frequency energy from antenna 7 and at the same time is supplied to actuate time base generator 24. Generator 24 produces a pair of voltage pulses of opposite polarity and lasting for approximately 100 microseconds, which are both supplied to range sweep generator 50, the negative pulse serving to excite in generator 50 a positive sweep voltage rising through a voltage range of about 100 volts linearly with time at a predetermined rate throughout the 100 microsecond interval, the positive pulse producing a positive pedestal voltage on which is superposed the rising sweep voltage. This sweep voltage on a pedestal recurs with each radar emission and starts simultaneously therewith. It is supplied by range sweep generator 50 at all times to range differential amplifier 110 and when switch S is closed upwards it is fractionally supplied also to vertical sweep amplifier 200.

Rate sweep generator 80 produces a sweep voltage slowly decreasing linearly with time from an adjustable initial value and at an adjustable rate of decrease. This sweep voltage occupies from 100 to 400 seconds to decrease through a range of 100 volts, so that throughout any 100 microsecond interval it may be considered constant. The output of generator 80 is likewise applied to range differential amplifier 110. Obviously, the initial value of the decreasing output voltage of generator 80 may be chosen less than the maximum value reached by the rising voltage of generator 50 so that in each 100 microsecond interval there will be an instant of equality of the two voltages on the input of range differential amplifier 110. As the voltage from generator 80 slowly decreases this instant of equality will occur progressively nearer to the start of the 100 microsecond interval, that is to say, nearer to the moment of emission of an object ranging pulse from antenna 7.

To anticipate the later description, it may here be said that the voltage from generator 80 is so chosen that at a given time the instant of equality of the sweep voltages from generators 50 and 80 occurs simultaneously with the reception by antenna 7 of an echo reflected from a chosen target and the rate of decrease of the voltage from generator 80 is so adjusted that this instant continues to occur simultaneously with the reflected echo as the range of the target decreases. Clearly, the means which so sets the rate of voltage decrease affords a measure of the rate of change of range of the target, that is to say, of the relative speed of target and plane. If the target is stationary and the plane's altitude is not a large fraction of the plane to target distance, the speed so measured is the ground speed of the airplane.

Before continuing the functional description of the system of Fig. 1 it is proper here to describe the circuits so far involved.

Referring now to Fig. 2 a short positive trigger pulse from pulse generator 14 is applied to grid 25 of the tube $V_1$, which is suitably a 6SN7, after differentiation by the circuit comprising condenser 26 and resistance 27. Grid 25 of tube $V_1$ is negatively biased by battery 28 so that tube $V_1$ is normally not conducting. Differentiating circuit C26R27 produces a positive pip at the leading edge of the trigger pulse, an instant hereinafter designated as $t_0$. A negative pip at the trailing edge on the trigger pulse is disregarded. Prior to the arrival of the positive pip on grid 25 no anode current flows in tube $V_1$ and there is no voltage drop across the resistor 29 through which anode 30 of $V_1$ is connected to 300 volt battery 31. Battery 31 is also connected through resistor 32 to anode 33 of tube $V_2$, a double triode such as a 6N7, through resistor 34 to grid 35 and through resistor 29 to anode 36 of $V_2$. Cathodes 38 and 39 are electrically connected together and through resistors 40 and 41 in series to ground. The junction of resistors 40 and 41 is connected to grid 42 through resistor 43 while grid 42 is shunted to ground by condenser 44. Cathode 45 of $V_1$ is likewise grounded. In all circuits cathode heating power is understood to be supplied though not shown. Between ground and cathode 39 of $V_2$ are connected condenser 46 and resistance 47 in series, from the junction of which, through condenser 48 shunted by resistor 49, a square topped voltage pulse negative to ground of 100 microseconds duration is fed to range sweep generator 50. Also to generator 50 a square topped voltage pulse, positive to ground, is fed from anode 33 of $V_2$. Of these voltage pulses, the former excites the rising sweep voltage produced by generator 50 while the latter provides the pedestal which the sweep voltage overlies.

In the circuit of Fig. 2, grid 25 of $V_1$ is normally biased to cut-off by battery 28. Grid 42 of tube $V_2$ is biased to cut-off by the voltage developed across resistors 40 and 41 in series by the flow of current in the right half of $V_2$ from anode 33 to cathode 39. Since grid 35 is connected through 1.5 megohm resistor 34 to battery 31, its voltage is slightly higher than that of cathode 38, namely, about 20 volts positive to ground and the right half of $V_2$ is normally conducting. Condenser 37 is connected between grid 35 and anode 36.

A positive voltage pip drives grid 25 positive, so that $V_1$ becomes conducting and its anode voltage falls. Anode 36 of $V_2$ is connected directly to anode 30 of $V_1$ and through condenser 37 to grid 35 of $V_2$. The fall of voltage at anode 30 thus is coupled through condenser 37 to grid 35 to cut-off the right half of $V_2$, and the consequent disappearance of current from resistors 40 and 41 permits the left half of $V_2$ to become conducting.

Initially, $V_1$ is not conducting, anodes 30 of $V_1$ and 36 of $V_2$ are 300 volts positive to ground. In $V_2$ cathodes 38 and 39 as well as grid 35 are 20 volts positive while anode 33 is about 267 volts positive to ground, the right half of $V_2$ being conducting while the left half of that tube is blocked. Grid 42 of $V_2$ is thus 20 volts negative with respect to cathode 39 and condenser 37 is thus across a potential difference of 280 volts between anode 36 and grid 35. The positive voltage pip from differentiating circuit C26R27 makes $V_1$ conducting and the potential at anodes 30 and 36 falls to about 165 volts. This drop of 135 volts at anode 36 is communicated through condenser 37 to grid 35 which accordingly falls to 115 volts negative to ground cutting off the right half of $V_2$ so that the potential of anode 33 rises to 300 volts. The current in resistors 40 and 41 becomes momentarily zero, thus removing the 20 volt negative bias on grid 42 so that the left half of $V_2$ becomes conducting, its anode 36 remaining 165 volts positive to ground. A small current now flows in cathode resistors 40 and 41 and condenser 37 starts to readjust its charge to the new voltage difference about 146 volts, between anode 36 and grid 35. This involves a rise in potential of grid 35 which on reaching the cut-off potential −10 volts allows the right half of $V_2$ to conduct. Now the flow of current of resistors 40 and 41 results in cut-off of the left half of $V_2$ and the initial conditions are restored. The readjustment of the charge of condenser 37 is by a partial discharge through resistor 34 and the left half of $V_2$. The time constant C37R34 is 300 microseconds and the rise in potential at grid 35 of $V_2$ from −115 volts to −10 volts requires 100 microseconds. During this interval the potential of anode 33 is 300 volts rising abruptly from 267 volts at the instant $V_1$ becomes conducting and falling rapidly 100 microseconds later. This furnishes a 33-volt positive square topped pulse. At the end of the 100 microsecond interval the potential of anode 33 falls slightly below the initial value of 267 volts because of a small flow of current from grid 35 to cathode 38. The 33-volt positive pulse is used as pedestal voltage in range sweep generator 50 and the terminal distortion is unimportant. Condenser 44 of capacitance .006 microfarad holds grid 42 at constant voltage with respect to ground. Simultaneously with the positive pulse at anode 33, there is produced a negative, square topped, pulse across resistors 40 and 41 due to the abrupt drop and succeeding rise of current therein, a negative pulse which is taken off between cathode 39 and ground and is used as above stated to produce the sweep voltage in generator 50. Here the terminal distortion is harmful and is removed by the filter circuit comprising condenser 46, resistor 47 and condenser 48 shunted by resistor 49.

The input terminals of the circuit of Fig. 2 are A and ground G, across which the trigger pulse from generator 14 is applied. The output terminals are $B_1$, $C_1$ and ground $G_1$, the sweep producing pulse being taken between $C_1$ and ground, the pedestal pulse between $B_1$ and ground. Time base generator 24, which the circuit of Fig. 2 constitutes, defines the duration of the voltage rise in range sweep generator 50 and thus the range of the most distant target to be considered. The 100 microsecond interval, corresponding to a target distance of about 10 miles, is fixed by the choice of condenser 37 and resistor 34, in the case described 200 micromicrofarads and 1.5 megohms, respectively. The sweep interval is in any case preferably somewhat shorter than the interval between successive signals from antenna 7 which in some radar installations may be long enough for a 100 mile range to be dealt with.

In Fig. 3 is shown the circuit of range sweep generator 50. Input terminals for generator 50 are $B_2$ and $C_2$ on which are impressed positive and negative pulses from terminals $B_1$ and $C_1$ respectively, of Fig. 2, and ground G. The negative square topped voltage pulse at terminal $C_1$ of Fig. 2 is applied at terminal $C_2$ of Fig. 3 to grid 51 of tube $V_3$, a 6AC7, for example, initially conducting and rendered inactive when a negative pulse arrives at grid 51. Screen grid 52 of $V_3$ is supplied through resistor 55 from battery 31′ which may be the same as battery 31 serving to supply all voltages of the system of Fig. 1. Grid 52 is shunted to ground by condenser 56 while suppressor grid 53 and cathode 54 are grounded. Anode 57 is supplied through resistor 58 and bias control tube $V_5$, a diode such as one-half of a 6H6, from the junction of resistors 59 and 60, these resistors constitute a voltage divider between battery 31 and ground whereby anode 61 of $V_5$ is supplied with 50 volts. Cathode 62 of $V_5$ is connected through resistor 58 to anode 57 of $V_3$. Condenser 63 shunting resistor 58 is connected between anode 57 of $V_3$ and grid 64 of tube $V_4$ which is suitably one-half of a 6SN7GT. Anode 65 of $V_4$ is supplied directly from battery 31 while between cathode 66 and ground are connected resistors 67 and 68 in series.

Resistor R, preferably 200,000 ohms, is connected between cathode 66 and the junction of condenser 63 with anode 57. Between anode 57 and input terminal $B_2$ are connected condenser C about 200 micromicrofarads, and condenser C′, which may be 1,000 micromicrofarads, in series. Shunting this connection of condensers C and C′ are condensers 69 and 70 in series serving as a trimming capacitance. Condenser 69 is suitably an air condenser, while condenser 70 may have a capacitance of 1,000 micromicrofarads. Resistor $R_1$, about 330,000 ohms, is inserted between cathode 66 and the junction of condensers C and C′.

It will be observed that the positive pedestal voltage pulses from time base generator 24 applied to input terminal $B_2$ is interposed between ground and the circuit of Fig. 3 to the right of tube $V_3$. Further, those acquainted with sweep voltage generators, well described, for example, in "Time Bases" by O. S. Puckle, published in London in 1943, will recognize that the circuit of Fig. 3 is such a generator, inactive while tube $V_3$ is conducting but generating a rapidly rising voltage starting from the instant when $V_3$ is blocked by the negative pulse applied to grid 51 from generator 24. This rapidly rising voltage rises substantially linearly with time and continues so to rise until the negative pulse from generator 24 has passed from grid 51. The rate of voltage rise, controlled by the ratio of the voltage across condenser 63 to the product RC, is in the present circuit about 1 volt per microsecond. This sweep voltage appears as a voltage positive to ground at cathode 66 to which output terminal $D_1$ is connected. Tube $V_4$ is an amplifier tube supplying negative feedback to linearize this voltage wave as a function of time while the circuit $R_1C'$ is an integrating circuit further contributing to the desired linearity.

The output voltage from the circuit of Fig. 3 is taken between terminal $D_1$ and ground, or a desired fraction of it may be taken between terminal $E_1$ and ground. Terminal $D_1$ is used when switch S, Fig. 1, is closed downward, terminal $E_1$ when S is closed upward.

Resistors 55, 59 and 60 are respectively about 68,000, 20,000 and 100,000 ohms while resistor 58 is 2.2 megohms. Resistors 67 and 68 are about 250,000 and 50,000 ohms, respectively, so that the pedestal and sweep voltages at terminal $E_1$ are each about one-sixth those at terminal $D_1$.

It will be clear from the foregoing description that in the circuit of Fig. 2 tube $V_2$ is a single-shot multivibrator synchronized by tube $V_1$ with the trigger pulse which simultaneously actuates radar system 1. The output negative pulse from terminal $C_1$ controls the conductance of tube $V_3$ in the circuit of Fig. 3, and the duration of the voltage rise at terminals $D_1$ and $E_1$ of Fig. 3. This voltage rise is linearized by negative feedback from tube $V_4$ and further improved in linearity by the integrating circuit $R'C'$, for which values of resistance and capacity are chosen with regard to the values of R and C and the amplification factor of tube $V_4$. Diode $V_5$ is so inserted that in the intervals between successive sweeps condenser 63, of .006 microfarad capacitance, may be rapidly charged by diode $V_5$ through tube $V_3$, which is during such intervals conducting, and so be at a fixed potential at the start of each successive pulse from tube $V_2$. The circuit of Fig. 3 is not itself a part of the present invention but is disclosed and claimed in the copending application of J. W. Rieke, filed March 21, 1944, Serial No. 527,457, assigned to the same assignee as the present application.

The voltage at terminal D varies from about 100 to about 200 volts, starting with about 65 volts during the interval between sweeps, to which a 33-volt pedestal is added at the start of the sweep.

The rate sweep generator, of which the circuit is shown in Fig. 4, provides a voltage slowly decreasing between terminal $F_1$ and ground from about 200 to about 100 volts over a time interval varying from 1½ to 6 minutes. The circuit of Fig. 4 includes vacuum tubes $V_6$, $V_7$ and $V_8$ and voltage regulator tube $V_9$. Suitably tubes $V_6$ and $V_7$ are respectively, the two triodes contained in a 6SL7, $V_8$ is one-half of a 6SN7GT while $V_9$ is a VR75. Battery 31 supplies the voltage required in the circuit of Fig. 4. Across this battery is connected potentiometer 81 of about 10,000 ohms resistance, on which tap 82 selects a fractional voltage adjusted, as later described, to be proportional to the speed of the airplane relative to the target. This fractional voltage appears across resistor 83, about ½ megohm, and from a fixed point 84 thereon about $\frac{1}{10}$ of the voltage selected by tap 82 is applied through 3 megohm resistor 85 to grid 86 of tube $V_6$. Cathode 87 is connected through resistor 88 to the positive terminal of battery 31 and to ground through the 300 ohms of resistors 89 and 90 in series. Variable resistor 89 is so adjusted that when tap 82 is at ground no current flows in resistor 85.

Anode 91 of $V_6$ is directly connected to cathode 92 of $V_7$ of which grid 93 is positively biased from the junction of resistors 94 and 95 to a potential of about 45 volts. Anode 96 of $V_7$ is supplied from battery 31 through 10-megohm resistor 97. Sweep condenser $C''$, 4 microfarads, together with resistor 85 constitutes the sweep circuit controlled by the voltage taken between point 84 and ground. Effectively condenser $C''$ is connected between grid 86 of $V_6$ and anode 96 of $V_7$, which tubes constitute a direct coupled direct current amplifier supplying negative feedback to linearize with time the variation in voltage across condenser $C''$. Actually, instead of being directly joined to anode 96, condenser $C''$ is connected to cathode 98 of tube $V_8$, of which grid 99 is joined through resistor 100 to anode 96 of $V_7$. Anode 102 of $V_8$ is directly supplied from battery 31, the load resistor of $V_8$ being composed of voltage regulator tube $V_9$ in series with resistor 103. Across tube $V_9$ is shunted resistor 104 which may be of 100,000 ohms resistance and is tapped to furnish at terminal $F_1$ a desired fraction of the constant voltage across tube $V_9$, plus the decreasing voltage across resistor 103. Battery 105, derived from battery 31, provides a negative voltage to stabilize tube $V_9$. Grid 99 of $V_8$ is shunted to ground by condenser 106, which with resistor 100 serves to prevent oscillations of voltage at grid 99. Tube $V_8$ functions as a cathode follower tube so that condenser $C''$ when connected between cathode 98 of $V_8$ and grid 86 of $V_6$ is effectively connected between that grid and anode 96 of $V_7$. To increase the amplification positive feedback is provided by resistor 107 between cathode 98 of $V_8$ and cathode 87 of $V_6$, thereby raising the amplification factor of the amplifier circuit to 5,000.

Switch S' is closed as shown in Fig. 4, when switch S of Fig. 1 is closed upward. Closing switch S' connects battery 31 through 5,000 ohm resistor 108 to one plate of condenser $C''$, the other plate thereof being connected to grid 86, which is at ground potential and only about 2 volts negative to cathode 87. Condenser $C''$ accordingly charges to about 195 volts (battery 105 opposing battery 31) positive to ground at cathode 98, through resistor 108 and the grid-cathode circuit of $V_6$. This voltage also appears across tube $V_9$ and resistor 103, 75 volts being across tube $V_9$. Thus, the tap 109 on resistor 104 makes available at terminal $F_1$ 120 volts plus a desired fraction of 75 volts. This is a steady state voltage independent of the operation of the sweep circuit of Fig. 3. The equality of this voltage with the sweep voltage from range sweep generator 50 can be set by adjustment of tap 109 to occur at any desired instant in the 100 microsecond interval between near its end and near its beginning.

When switch S' is opened, condenser $C''$ starts to discharge through 3 megohm resistor 85, the discharge rate being controlled by the voltage at tap 84. From the stated values of capacity of condenser C" and resistance of resistor 85 time constant C"R85 appears to be 12 seconds, but the effective time constant determining the linearity of the sweep is the product of this 12 seconds by the amplification factor obtained from tubes $V_6$, $V_7$ and $V_8$, namely 1,000 minutes. In the circuit of Fig. 4 enough amplification is provided to make unnecessary an integrating circuit such as R'C' of Fig. 3. By analysis of the operation of Fig. 4 when switch S' is opened, it may be shown that as condenser C" discharges, grid 86 of $V_6$ remains substantially at ground potential, so that the discharge current through resistor 85 is determined by the voltage at tap 84. The operation is in effect a cancellation of the charge placed on condenser C" when S' is closed, by an opposing sweep charge whereby the voltage across C" is caused to fall at a rate equal to E'/R85C" volts per second where E' is the voltage to ground at tap 84. When E' is 12 volts the voltage at cathode 98 and so at terminal $F_1$ will fall 1 volt per second, the voltage drop across $V_9$ is constant. Therefore, if initially with S' closed, tap 109 is at cathode 98 and E'=12 volts, the instant of equality of the voltages, from terminal $F_1$ and from terminal $D_1$ of Fig. 3 will move when S' is opened in 100 seconds from near the end to near the beginning of the 100 microsecond interval prescribed by time base generator 24.

The rate sweep circuit of Fig. 4 is also not a part of the present invention but is described and claimed in the copending application of J. W. Rieke above referred to.

Figure 5:
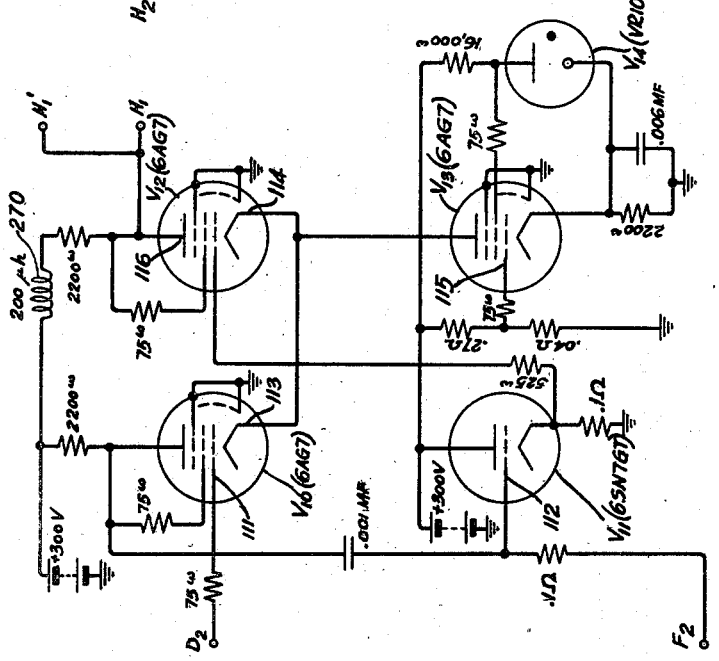

In the system of Fig. 1, the major components following range sweep generator 50 and the rate sweep generator 80 use known circuit arrangements and will be here described chiefly functionally, reference being made to the attached drawings for the circuit details. Referring to Fig. 5, vacuum tubes $V_{10}$ and $V_{11}$ of range differential amplifier 110 receive on grids 111 and 112, respectively, the voltages appearing at points $D_1$ of Fig. 3 and $F_1$ of Fig. 4. Of these voltages the first is a rising sweep voltage lasting 100 microseconds, the second is a voltage slowly decreasing over a comparatively long time equaled by the rising voltage at an instant in the 100-microsecond interval depending on the positions of taps 82 and 109 of Fig. 4. Tube $V_{12}$ is an amplifying tube providing positive feedback to tube $V_{10}$ through constant current tube $V_{13}$ which is inserted between ground and joined cathodes 113 and 114 of tubes $V_{10}$ and $V_{12}$, respectively. The cathode current of tubes $V_{10}$ and $V_{12}$ is controlled by the potential of grid 115 of $V_{13}$. Tube $V_{11}$ is a buffer tube protecting rate sweep generator 80 from loading due to grid current in tube $V_{12}$, while voltage regulator tube $V_{14}$ controls the screen voltage of $V_{13}$.

It may be shown by analysis of the operation of the circuit of Fig. 5 that when the voltages at terminals $D_2$ and $F_2$ are equal there appears a square-topped positive pulse at anode 116 of $V_{12}$ which continues to the end of the 100-microsecond interval. This pulse is supplied from terminal $H_1$ to video mixing amplifier 140 and from terminal $H_1'$ when switch S is closed downward to vertical sweep amplifier 200.

Figure 6:
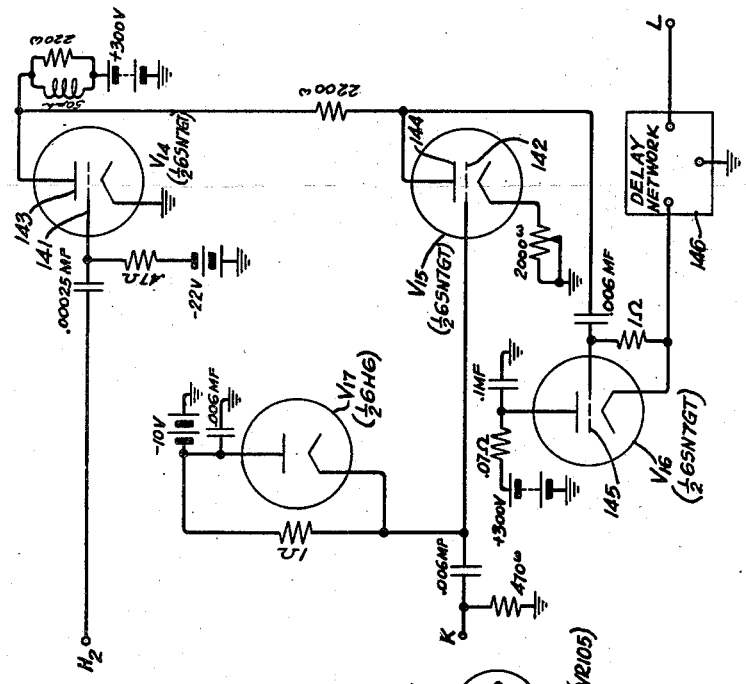

The circuit of video amplifier 140, of Fig. 1, is shown in Fig. 6. It comprises pulse amplifying tube $V_{14}$, on grid 141 of which is impressed the pulse from terminal $H_1$ of Fig. 5, and video amplifier tube $V_{15}$ of which grid 142 receives at terminal K the echo signal from video amplifier 17 of Fig. 1. The bias of grid 142 is controlled by tube $V_{17}$. The amplified positive pulse at anode 143 of $V_{14}$ and the amplified echo signal at anode 144 of $V_{15}$ are applied on grid 145 of tube $V_{16}$, from the cathode circuit of which are fed a pair of negative voltage pips corresponding respectively to the arrival of the echo signal at terminal K and the start of the square-topped pulse applied to terminal $H_2$. For a reason later given these voltage pips are delayed 5 microseconds by network 250. Ground terminals, not shown, are provided for the circuits of Figs. 5 and 6 and subsequent figures.

In Fig. 7 is shown the circuit of final video amplifier 170. Terminal L' receives from terminal L of Fig. 6 the negative voltage pips, delayed 5 microseconds by network 250, and applies these to grid 171 of tube $V_{18}$ in amplifier 170. The amplification and reversal of sign of these voltage pulses is accomplished by tubes $V_{18}$ and $V_{19}$ so that corresponding positive voltage pips are available at terminal N. To permit these voltages to produce traces on screen 2 of oscilloscope 3 of Fig. 1, the positive pips are superimposed on a positive pedestal voltage derived from tube $V_{20}$ to grid 173 of which are applied via terminal N unblanking pulses that are explained in the description of Fig. 8. It is convenient to provide also at terminal Z a blanking voltage, derived in any convenient manner from radar system 1 to blank the oscilloscope trace during the rearward pointing of antenna 7. This blanking voltage may be a positive voltage applied to grid 172 of tube $V_{21}$ during such rearward pointing and replaced by a ground when antenna 7 points forward of the airplane. When present the blanking voltage annuls the output voltage at terminal N. Thus, only when antenna 7 points forward is the negative bias of grid 18, Fig. 1, to be overcome and the trace is brightened only when a positive voltage pip appears at terminal N together with a pedestal voltage from tube $V_{20}$.

In Fig. 8, the circuit of vertical sweep amplifier 200 comprises tubes $V_{22}$, $V_{23}$, $V_{24}$ and $V_{25}$. Tubes $V_{22}$ and $V_{23}$ are suitably the two triodes of a 6SN7GT. Their respective anodes 201 and 202 are supplied from battery 31 through resistor 203. Grids 204 and 205 are biased 50 volts negative by battery 206 through resistors 207 and 208 for grid 204, 209 and 210 for grid 205 and further biased by the voltage drop in common cathode resistor 211. When switch S, Fig. 1, is closed upward the fraction of the output sweep voltage of range sweep generator 50 appearing at terminal $E_1$ of Fig. 3 is applied via terminal I through condenser 212 to grid 204. At the same time switch S" ganged with switch S, is closed upward and grounds the junction of resistors 207 and 208 thereby removing from grid 204 the bias of battery 206. As a result, tube $V_{22}$ becomes conducting, increasingly so as the sweep voltage rises at terminal I. A correspondingly increasing current flows in resistor 211. At the same time a negative voltage wave appears at anode 201 which is transferred from terminal M' to terminal M of Fig. 7. The bias on grids 204 and 205 suffices to cut off the pedestal of the voltage from the range sweep generator and only a rising voltage appears across resistor 211 to be transferred through stopping condenser 213 and resistor 214 to the junction of resistors 216 and 217 of which the other terminals are connected respectively to grids 218 and 219 of tubes $V_{24}$ and $V_{25}$, these grids being normally biased to cut off through resistor 220 by battery 221. Tubes V24 and V25 are amplifying tubes in parallel and at their anodes 222 and 223 there appears the amplified sweep voltage which produces a vertical ray deflecting current in coil VDC of oscilloscope 3. A permanent magnet, not shown, is used to fix the starting point of the vertical sweep, preferably near the bottom of screen 2.

Referring again to video amplifier 170 of Fig. 7 the negative voltage wave arriving at terminal M is reversed in sign in tube V20 and ultimately appears as an unblanking pulse across resistor 176 in the cathode circuit of tube V19. This pulse is applied to intensity grid 18 of oscilloscope 3 which thus allows the trace on screen 2 to brighten when there arrives a negative pulse at terminal L'. Such a pulse, either a radar target echo or one occurring at the instant of equality of range sweep and rate sweep voltages produces a bright spot on screen 2.

Referring to Fig. 8, when switches, S, S' and S'' are thrown downward, tube V23 is rendered conducting and the positive square-topped pulse produced by range differential amplifier 110 produces a voltage across cathode resistor 211 which now is a square-topped wave, positive to ground, beginning at the instant of equality of range and rate sweep voltages and lasting to the end of the 100 microseconds time base interval. The cut-off bias of grids 218 and 219 is reduced to zero. The voltage at anodes 222 and 223 abruptly drops at the start of this cathode voltage and rises thereafter exponentially. This exponential rise in anode voltage of tubes V24 and V25 results in a rise in anode current which flows in coil HDC, the inductance of which is so chosen that the duration of this current is about 11 microseconds.

It is thus clear that when switches S, S' and S'' are closed upward a vertical sweep starts from the bottom of oscilloscope screen 2 and lasts 100 microseconds. During this sweep a bright spot appears on screen 2 only when there arrives on grid 18 either a target echo from radar system 1 or a pulse from range differential amplifier 110 at the instant range and rate sweep voltages are equal. The azimuth sweep current through coil HDC is controlled from potentiometer 22 of radar system 1, so that a target echo brightens the oscilloscope trace at a point corresponding horizontally to the target bearing, vertically to the target range. On the other hand, the voltage equality pulse is independent of the rotation of antenna 7 and the corresponding trace brightness appears as a horizontal line.

Fig. 9A represents the appearance of screen 2 under these conditions. T is a target spot horizontally centered while RL is a line formed by the fusion of spots representing equality of range and rate sweep voltages. The vertical position of spot T represents target range, decreasing as the plane flies onward. Range line RL is made to intersect spot T at an initial instant by proper setting of tap 109 of Fig. 4. Spot T appears lower and lower as time goes on. While tap 109 may be manually shifted to maintain coincidence of RL and T, it is convenient to throw downward switch S and switches S' and S'' ganged with it. Now, as previously described, a vertical sweep 11 microseconds long starts only at the moment of equality of range and rate voltages and line RL appears in a fixed position on the screen. This position would be at the bottom were it not for delay network 250 which delays the echo pulse and the range line pulse each about 5 microseconds.

Fig. 9B shows the appearance of screen 3 when switches S, S' and S'' are thrown downwards. Range line RL appears vertically centered and stationary on screen 3 since its creating voltage pip on grid 18, although simultaneous with the equality of voltages starting the sweep, is delayed a constant 5 microseconds relative to the moment of such equality. This moment is continually earlier because the voltage at tap 82 on potentiometer 81 determines the date of decrease of the rate sweep voltage, which accordingly equals the rising range sweep voltage at a continually earlier epoch in the time base interval. If tap 82 is so set that this advance of the moment of equality is proportional to the rate of decrease of the range from plane to target, spot T will continue to be intersected by line RL.

It will be noted that delay network 250 serves the purpose of placing the intersecting range line and target spot on the screen in a position convenient for observation. Further, it will be realized that it is much simpler to adjust tap 82 to maintain the coincidence of spot T and line RL than it is by adjustment of tap 109 to follow the moving target spot of Fig. 9A.

The operative procedure thus requires that with switches S, S' and S'' thrown upward, tap 109, Fig. 4, be set to make line RL, Fig. 9A, intersect spot T. The ganged switches are then thrown downward and tap 82 is adjusted so to control the rate of decrease of the rate sweep voltage, that in Fig. 9B line RL continues to intersect spot T. The setting of tap 82 thus produces a voltage to ground proportional to the plane's velocity relative to the target considered. This velocity, as previously stated, is with a fixed target substantially the ground speed of the plane. This speed is thus measured by the system of the invention independently of the conditions of light or weather.

While the invention has been described with reference to a situation in which the target range is continually decreasing, those skilled in the art are acquainted with means for inverting the decreasing voltage from the rate sweep generator to obtain an increasing voltage. This enables them to maintain the range line RL intersecting target spot T as the range increases, thereby adapting the disclosed system to measure speeds of recession as well as of approach.

What is claimed is:

1. The method of measuring the speed of a vessel relative to an object at a varying range ahead of said vessel, said range being determinable, which comprises the steps of determining said range, defining a repetitive time interval, establishing a first voltage rising substantially linearly with time during said repetitive interval, establishing a second voltage decreasing at a controllable rate substantially linearly with time over a desired interval longer than said repetitive interval, defining in said repetitive interval an instant representative of said range and varying in accordance therewith, adjusting said second voltage to equality with said first voltage at an instant in said repetitive interval coincident with said representative instant at an initial definition thereof, and controlling the rate of decrease of said second voltage to maintain the simultaneity of occurrence of said equality and said representative instant, whereby said rate of decrease so controlled is proportional to said speed.

2. Means for measuring the rate of decrease of the range from an airplane to a target ahead of said airplane comprising electrical means for ranging and locating said target including a cathode ray oscilloscope provided with a fluorescent screen on which the vertical position of a luminous spot moves in accordance with the change in range of said target, electrical means for producing on said screen a luminous horizontal line intersecting said spot in an initial position thereof and electrical means including a potentiometer graduated in velocity units for moving said line to follow said spot.

3. Means for measuring the speed of a vessel relative to an object ahead comprising electrical means for ranging and locating said object including a cathode ray oscilloscope provided with a fluorescent screen on which the vertical position of a luminous spot represents the range of said object, electrical means for producing a horizontal luminous line on said screen intersecting said spot in an initial position thereof and electrical means including a potentiometer graduated in velocity units for maintaining said spot and said line stationary on said screen.

4. Means for measuring the speed of a vessel relative to and in the direction of an observed target comprising electrical means for ranging and locating said target including a cathode ray oscilloscope provided with a fluorescent screen on which the vertical position of a luminous spot represents the range of said target, electrical means for producing a horizontal luminous line on said screen intersecting said spot in an initial position thereof and electrical means including a potentiometer graduated in velocity units for maintaining said line continuously intersecting said spot.

STEPHEN DOBA, Jr.